(12) United States Patent
Sowers (10) Patent No.: US 11,284,610 B1
(45) Date of Patent: Mar. 29, 2022

(54) SYSTEM AND METHOD FOR A MOSQUITO TRAP

(71) Applicant: Howard Sowers, Edgewater, FL (US)

(72) Inventor: Howard Sowers, Edgewater, FL (US)

( * ) Notice: Subject to any disclaimer, the term of this patent is extended or adjusted under 35 U.S.C. 154(b) by 0 days.

(21) Appl. No.: 17/203,748

(22) Filed: Mar. 17, 2021

(51) Int. Cl.
*A01M 1/10* (2006.01)
*A01M 1/02* (2006.01)

(52) U.S. Cl.
CPC ............ *A01M 1/106* (2013.01); *A01M 1/02* (2013.01); *A01M 2200/012* (2013.01)

(58) Field of Classification Search
CPC .......... A01M 1/02; A01M 1/10; A01M 1/106; A01M 1/12; E03B 1/041; E03B 1/042; E04D 13/04; E04D 13/0404; E04D 13/0445; E04D 13/064; E04D 13/0645
USPC .................................................. 141/331–334
See application file for complete search history.

(56) References Cited

U.S. PATENT DOCUMENTS

| | | | | |
|---|---|---|---|---|
| 4,037,351 A * | 7/1977 | Springer | .................. | A01M 1/02 43/112 |
| 4,630,569 A * | 12/1986 | Dieleman | ............ | A01K 45/002 119/69.5 |
| 4,937,969 A * | 7/1990 | Kawabe | .................. | A01G 31/02 47/17 |
| 5,305,545 A * | 4/1994 | Cerullo | .................. | A01M 23/10 43/72 |
| 5,896,697 A * | 4/1999 | Kang | ...................... | A01M 1/02 43/133 |
| 6,079,951 A * | 6/2000 | Morton | ................. | A01K 45/002 119/69.5 |
| 6,112,453 A * | 9/2000 | Clarke, Jr. | .............. | A01M 1/04 43/113 |
| 6,338,220 B1 * | 1/2002 | Dicks | .................... | A01K 67/033 43/132.1 |
| 6,708,443 B2 * | 3/2004 | Hall | ........................ | A01M 1/02 43/107 |
| 6,889,395 B1 * | 5/2005 | Hodges | ..................... | E03B 1/04 4/665 |
| 6,941,702 B1 * | 9/2005 | Abrams | .................. | E03B 1/041 52/16 |
| 6,990,768 B1 * | 1/2006 | Boston | ..................... | A01M 1/02 119/69.5 |
| 7,207,748 B1 * | 4/2007 | Urban | ..................... | A01G 25/00 405/51 |
| 7,434,351 B2 * | 10/2008 | Bette | ...................... | A01M 1/106 43/107 |
| 7,448,160 B2 * | 11/2008 | Roberts | .................... | A01M 1/12 43/107 |
| 8,261,695 B2 * | 9/2012 | Huber | ................... | A01K 45/002 119/69.5 |

(Continued)

FOREIGN PATENT DOCUMENTS

| | | | | |
|---|---|---|---|---|
| EP | 1251218 A1 * | 10/2002 | .............. | E03B 3/03 |
| WO | WO-2012100296 A1 * | 8/2012 | ......... | A01M 1/2038 |
| WO | WO-2019221014 A1 * | 11/2019 | ............. | A01M 1/06 |

*Primary Examiner* — Peter M Poon
*Assistant Examiner* — Morgan T Barlow
(74) *Attorney, Agent, or Firm* — Christopher Mayle (57) ABSTRACT

A system and method for a free-standing device that uses a pool of stagnant water to attract female mosquitoes to deposit their eggs in a container whereby the device automatically self-flushes periodically the eggs from the container through a valve into its self-contained reservoir which then replenishes the container after the eggs have been discarded.

11 Claims, 5 Drawing Sheets

(56) References Cited

U.S. PATENT DOCUMENTS

| | | | |
|---|---|---|---|
| 8,424,549 B1* | 4/2013 | Goldsmith | E04H 15/60 135/120.4 |
| 8,939,182 B2* | 1/2015 | Lambke | B67D 7/00 141/198 |
| 9,049,855 B2* | 6/2015 | Rocha | A01M 1/023 |
| 9,326,497 B2* | 5/2016 | Rocha | A01M 1/023 |
| 9,714,521 B1* | 7/2017 | Aloumanis | E04H 15/54 |
| 10,588,306 B2* | 3/2020 | Hur | A01M 1/08 |
| 2002/0121045 A1* | 9/2002 | Hall | A01M 1/026 43/107 |
| 2004/0040598 A1* | 3/2004 | Zimmerman, Jr. | E03B 1/042 137/357 |
| 2005/0236498 A1* | 10/2005 | Cunningham | B01F 15/00253 239/313 |
| 2006/0090391 A1* | 5/2006 | Huang | A01M 1/106 43/107 |
| 2007/0006520 A1* | 1/2007 | Durand | A01M 1/06 43/129 |
| 2008/0262650 A1* | 10/2008 | Dorendorf | A01M 7/0092 700/240 |
| 2009/0205266 A1* | 8/2009 | Fennell | E03B 1/04 52/79.1 |
| 2009/0277076 A1* | 11/2009 | Boston | A01M 1/12 43/132.1 |
| 2011/0277852 A1* | 11/2011 | Sly | E03B 1/041 137/357 |
| 2011/0308618 A1* | 12/2011 | Lorenz | E03B 1/042 137/1 |
| 2012/0017834 A1* | 1/2012 | Holland | A01M 1/106 119/6.5 |
| 2012/0266519 A1* | 10/2012 | Wright | A01M 1/106 43/113 |
| 2013/0220901 A1* | 8/2013 | Garios | C02F 1/004 210/86 |
| 2014/0137462 A1* | 5/2014 | Rocha | A01M 1/08 43/113 |
| 2014/0165452 A1* | 6/2014 | Rocha | A01M 1/06 43/113 |
| 2014/0191058 A1* | 7/2014 | Taranta | B05B 9/0838 239/8 |
| 2015/0082687 A1* | 3/2015 | Neff | A01M 1/12 43/111 |
| 2017/0234030 A1* | 8/2017 | Macias | E04H 15/34 135/20.1 |
| 2018/0000093 A1* | 1/2018 | Nchekwube | A01M 1/226 |
| 2018/0092344 A1* | 4/2018 | Tyler | A01M 1/04 |
| 2018/0288993 A1* | 10/2018 | Focks | A01M 1/06 |
| 2018/0360018 A1* | 12/2018 | King | A01M 1/106 |
| 2019/0230914 A1* | 8/2019 | Williams | A01M 1/02 |
| 2019/0327951 A1* | 10/2019 | Selvig | G05B 15/02 |
| 2019/0380325 A1* | 12/2019 | Bender | G06N 20/00 |
| 2020/0000079 A1* | 1/2020 | Liu | A01M 1/04 |
| 2020/0081152 A1* | 3/2020 | Liu | A01M 1/103 |
| 2021/0084882 A1* | 3/2021 | Hartnoll | G05D 1/005 |

* cited by examiner

SYSTEM AND METHOD FOR A MOSQUITO TRAP

FIELD OF THE DISCLOSURE

The overall invention relates to a system and method for a mosquito trap and is more particularly directed to one that traps the mosquito when in the larvae stage.

BACKGROUND

The mosquito is an amphibious insect where part of its life is spent in water as larvae and pupae and later in life they begin to fly as adults. Mosquitos range from being a nuisance to carriers of diseases such as malaria, West Nile, dengue, Zika, and more. The mosquito life begins when the female mosquito lays its eggs on the surface of stagnant water. Larvae soon hatch out, swim in the water seeking minute water organisms as food. The larvae then transform into pupae and then eventually into an adult mosquito. Development from a new egg to an adult mosquito takes from nine to fourteen days.

Conventionally there have been many ways to get rid of mosquitoes, such as insecticides but the danger of using certain insecticides is while destroying mosquitos they may also destroy other forms of beneficial insects as well as being dangerous to human and animal life. Thus, exists a need for an innovative system and method that traps the mosquito when it is in its larvae stage and destroys the mosquito.

SUMMARY

It is therefore the object of the present invention to provide a mosquito trap, having a storage tank, the storage tank configured to receive water from an outside source, and a bowl holding the water in a stagnant form for a female mosquito to deposit their eggs, the bowl receiving the water from the storage tank through an opening, wherein the water is recirculated out of the bowl, the mosquito trap further having a submersible shredder pump as the that cuts the eggs of the female mosquito after leaving the bowl, a receiving compartment that receives the water from the bowl, the receiving compartment having one or more filters to capture the eggs after leaving the bowl, wherein the storage tank are enclosed in a stand of the mosquito trap positioned below the bowl, the stand extending downward into a base, the base used as support, one or more sensors to detect when the storage tank needs to be refilled, a control system that receives data from the one or more sensors and calculates needed operations based on the inputted data, a communication system connected to the control system wherein a user interface is presented to a user on a separate computing device to control one or more operations of the mosquito trap, wherein input from the user interface controls when the water from the bowl is ejected, and a roofing structure positioned above the bowl to provide shade for the water.

It is another object of the present invention to provide a mosquito trap having a storage tank, the storage tank configured to receive water from an outside source, a base, a stand extending upward from the base, a bowl holding stagnant water for a female mosquito to deposit their eggs, the bowl receiving water from the storage tank wherein the water is recirculated out of the bowl, wherein the stand has a door to provide access to the storage tank, further including a roofing structure positioned above the bowl to provide shade for the water, a valve to control the flow of water to and from the bowl by the opening, wherein the is a shredder pump that cuts the eggs of the female mosquito after leaving the bowl, further including a receiving compartment that receives the water from the bowl, one or more sensors to detect when the storage tank needs to be refilled or when there are eggs in the bowl, a control system that receives data from the one or more sensors and calculates needed operations based on the inputted data, a communication system connected to the control system wherein a user interface is presented to a user on a separate computing device to control one or more operations of the mosquito trap, wherein input from the user interface controls when the water from the bowl is ejected, wherein the mosquito trap is cylindrical in shape.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

In the Summary above and in this Detailed Description, and the claims below, and in the accompanying drawings, reference is made to particular features (including method steps) of the invention. The term "comprises", and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents, which operate in a similar manner to accomplish a similar purpose.

Certain terminology and derivations thereof may be used in the following description for convenience in reference only and will not be limiting. References in the singular tense include the plural, and vice versa, unless otherwise noted.

The present disclosure is generally drawn to a system and method, according to one or more exemplary embodiments, for a free-standing device that uses a pool of stagnant water to attract female mosquitoes to deposit their eggs. The device automatically self-flushes periodically into its self-contained reservoir which provides the water for the next flush. The device will also add water to the capture pool when needed due to evaporation by a rain collection device or receive water from an outside source.

Figure 1:
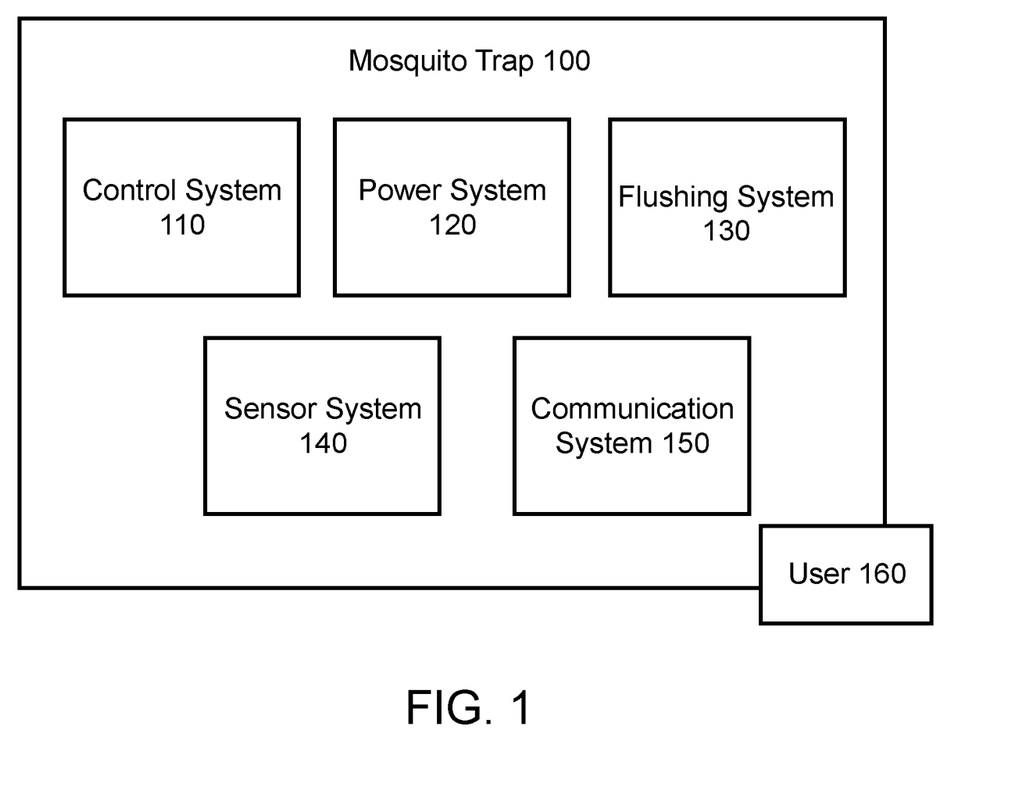
FIG. 1 shows a block diagram of the various systems of mosquito trap in accordance with the embodiments of the present invention.

With reference now to FIG. 1, FIG. 1 illustrates a block diagram of one exemplary embodiment of mosquito trap 100. Mosquito trap 100 may have a plurality of systems including a control system 110, a power system 120, a flushing system 130, a sensor system 140, and a communication system 150, which may be integrated into the overall system and structure of mosquito trap 100. The various systems may be individually configured and correlated with respect to each other so as to attain the desired objective of decreasing the mosquito population by disposing of the eggs.

Power system 120 of mosquito trap 100 provides power to flushing system 130, sensor system 140, and the circuits and components of control system 110 during the process of detecting one or more eggs and flushing out the eggs as well as recirculating the water. Mosquito trap 100 may be powered by methods known by those of ordinary skill in the art. In some embodiments, mosquito trap 100 may plug into an electrical outlet using an electrical cord to supply power to flushing system 130, sensor system 140, and the circuits and components of control system 110. Further power system 120 may include a rechargeable battery pack whereby the rechargeable battery is of a charge, design, and capacity, to provide sufficient power to flushing system 130, sensor system 140, and the circuits and components of control system 110 while running mosquito trap 100 for a set period of time needed to detect one or more eggs, flushing out the eggs, recirculating the water in mosquito trap 100.

Control system 110 may operate to control the actuation of the other systems. Control system 110 may have a series of computing devices which will be discussed in detail later in the description. Control system 110 may be in the form of a circuit board, a memory or other non-transient storage medium in which computer-readable coded instructions are stored and one or more processors configured to execute the instructions stored in the memory. Control system 110 may have a wireless transmitter, a wireless receiver, and a related computer process executing on the processors.

Computing devices of control system 110, may be any type of computing device that typically operates under the control of one or more operating systems, which control scheduling of tasks and access to system resources. Computing devices may be a phone, tablet, television, desktop computer, laptop computer, gaming system, wearable device electronic glasses, networked router, networked switch, networked, bridge, or any computing device capable of executing instructions with sufficient processor power and memory capacity to perform operations of control system 110.

The one or more computing devices may be integrated into control system 110, while in other non-limiting embodiments, control system 110 may be a remotely located computing device or server configured to communicate with one or more other control systems 110. Control system 110 may also include an internet connection, network connection, and/or other wired or wireless means of communication (e.g., LAN, etc.) to interact with other components. The connection allows a user, such as user 160, to update, control, send/retrieve information, monitor or otherwise interact passively or actively with control system 110.

Control system 110 may include control circuitry and one or more microprocessors or controllers acting as a servo control mechanism capable of receiving input from sensor system 140 and communication system 150, analyzing the input from sensor system 140 and communication system 150, and generating an output signal to flushing system 130, communication system 150 and power system 120. The microprocessors (not shown) may have on-board memory to control the power that is applied to flushing system 130, power system 120, and communication system 150 in response to input signals from the user 160 and from sensor system 140.

Control system 110 may include circuitry to provide an actuable interface for user 160 to interact with, including switches and indicators and accompanying circuitry for an electronic control panel or mechanical control panel. Such an actuable interface may present options to user 160 to select from that would allow user 160 to control how much water is recirculated through mosquito trap 100. Control system 110 may be preprogrammed with any reference values, by any combination of hardwiring, software, firmware to implement various operational modes including but not limited to temperature, light, and humidity values.

The microprocessors in control system 110 may also monitor the current state of circuitry within control system 110 to determine the specific mode of operation chosen by the user. For instance, when "on", the microprocessors may begin recirculating water at predetermined intervals. Further, such microprocessors that may be part of control system 110 may receive signals from any of or all systems, including without limitation, the flushing system 130, power system 120, and communication system 150. Such systems may be notified whether any of the components in the various systems need to be replaced, whether water needs to be replaced or refilled.

Figure 2:
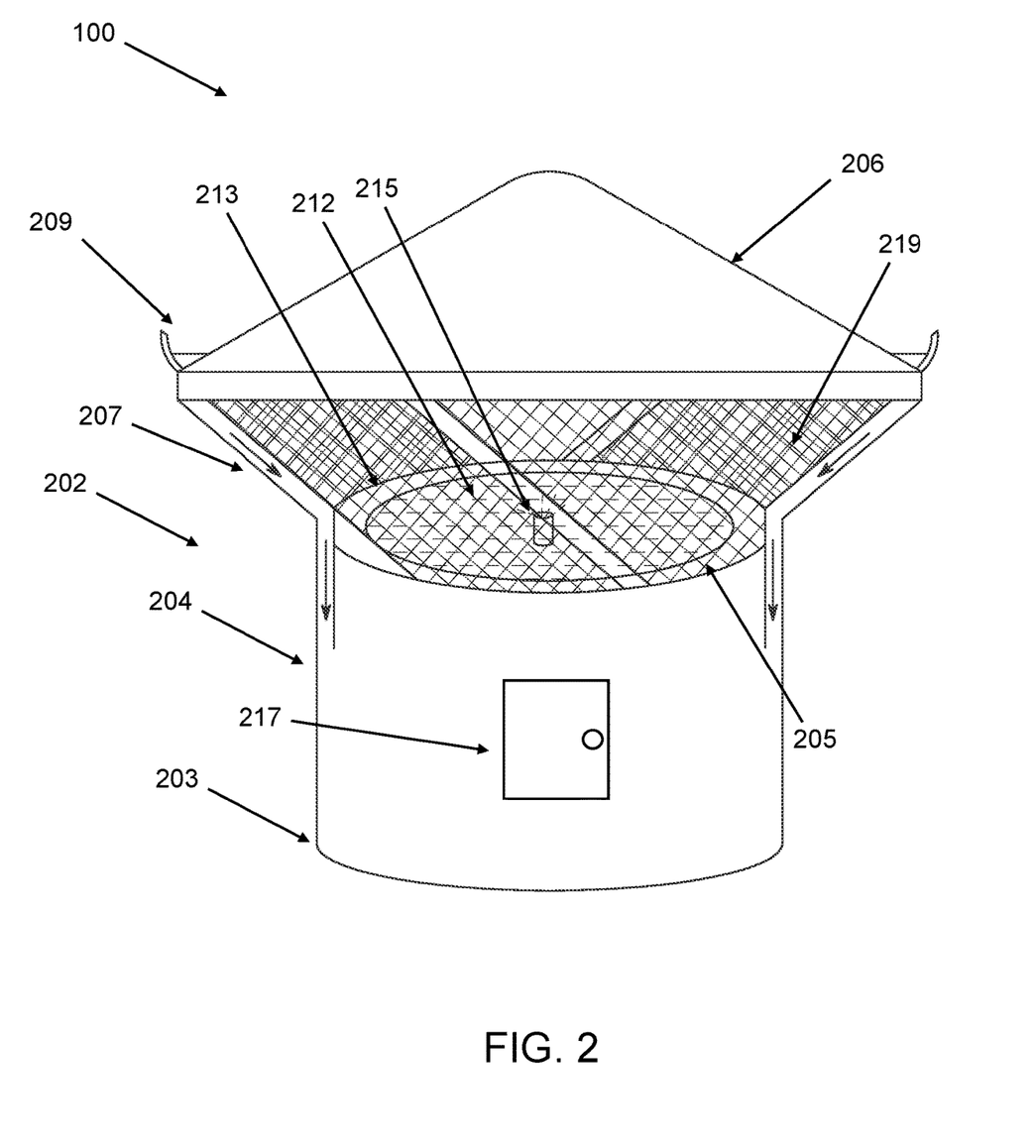
FIG. 2 shows an illustration of the mosquito trap.

With reference now to FIG. 2, FIG. 2 illustrates a diagram of one exemplary embodiment of mosquito trap 100. FIG. 2 is an example only of a mosquito trap 100. One of ordinary skill in the art will understand that variations to this system are within the scope of the invention. As shown in FIG. 2, mosquito trap 100 includes a housing 202 that is circular in shape with a base 203, whereby when placed on a support, base 203 comes into contact with the supporting surface. A stand 204 extends upward from an upper margin of base 203. Stand 204 then extends upward into a top element 205. Positioned into top element 205 may be bowl 212 having a rim 213 used to house the stagnant water for female mosquitoes to lay eggs in. Base 203 and bowl 212 are of a similar larger area or circumference. Stand 204 is hollow and contains the mechanisms and components of mosquito trap 100 whereby the inner cavity of stand 204 may be accessed by a door 217.

A roof structure 206 may extend from top element 205 for shade and to prevent rain from disturbing the smooth stagnant water in bowl 212 as well as shield from other climate elements. A mesh or netting 219 may be attached between top element 205 and roof structure 206 to prevent larger animals such as birds from getting through to bowl 212. Roof structure 206 may be connected by one or more connectors 207 whereby connectors have a rain collection device 209 that collects rain from by a series of channels leading from roof structure 206 through connectors 207 and into a storage tank. Bowl 212 may have a hemispherical shape with a hollow configuration defining a chamber 214 which has an opening 215 at its lowermost end above the upper end of the stand 204. However this is non-limiting and bowl 212 may be any shaped hollow container. Bowl 212 is designed to be shallow and as deep as necessary to attract female mosquitoes who will deposit their eggs.

Figure 3:
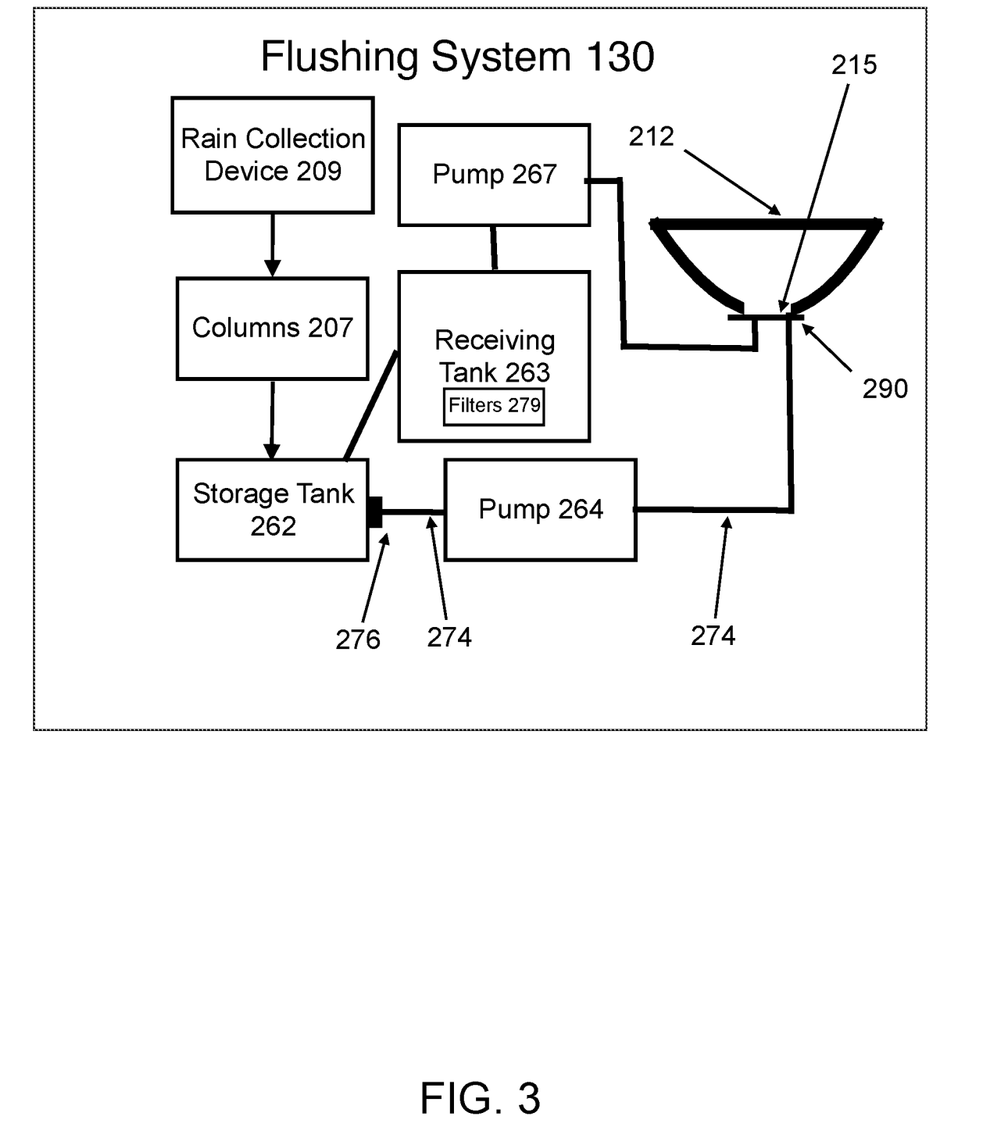
FIG. 3 shows a block diagram of the flushing system.

Flushing system 130 may have various subsystems that include pumping or otherwise transporting the water through a series of filters and tube upward to bowl 204, such as tubes 274 shown in FIG. 3. The subsystems may work in conjunction with each other or independently from one another. In some non-limiting embodiments flushing system 130 may act similar to a conventional toilet system with a series of valves for replacing and flushing the water with or without one or more pumps. Flushing system 130 may include a storage tank such as storage tank 262 connected to rain collection device 209 or apparatus known by those of ordinary skill in the art, whereby the rain may be collected and then deposited into storage tank 262. Storage tank 262 may also be accessible by door 217 on stand 204 such that user 160 may remove storage tank and replace water when needed. Storage tank 262 may be of various shapes and sizes. For example, storage tank 262 may be cylindrical, spherical, octagonal rectangular, or any other three-dimensional shape. Storage tank 262 may have a bottom with cylindrical sidewalls in one exemplary embodiment.

Storage tank 262 may be connected to a pump, such as pump 264, whereby pump 264 expels the water from storage tank 262 through tubes 274 that passes out of storage tank 262. Tubes 274 may be designed to extend outside of storage tank 262 and carry pressurized water pressurized by pump 264 through one or more pathways and valves and distributes water to bowl 212 through opening 215.

Tubes 174 may be connected to flushing system 130 by one or more quick connect fittings, such as quick connect fittings 276, whereby quick connect fittings 276 allow tubes 274 and flushing system 130 to be connected to each other as high pressurized water flows through them. Advantageously, having quick connect fittings 276 may also allow these systems and components to also be quickly disengaged from each other and separated when any or all of the components need to be replaced, which should help ensure for easy and quick maintenance of these components and systems.

Quick connect fittings 276 may include, without limitation, a collet, O-ring, and a body, whereby tubes 274 and tubes in flushing system 130 may be inserted through the collets, through the O-rings, and into the body of quick connect fittings 276, thus creating a water-tight seal so the water will not escape. As pressure increases inside of the tubes 274 and tubes in flushing system 130, the water or air forces the collets into grooves on the inside of quick connect fittings 276. The grooves compress the collet so that the teeth on the inside of the collet dig into the tubes 274 and tubes in flushing system 130, making it virtually impossible for the tubes 274 and tubes in flushing system 130 to disconnect. Tubes 274 may be made from rubber, stainless steel, or fused silica to provide suitable strength and cleanliness. However, this is non-limiting and tubes 274 may be made of any material suitable for high pressure use.

Pump 274 may be connected to valve 290 for containing water in bowl 212. Valve 290 may be spring-loaded, whereby when engaged or otherwise activated (e.g. such as by a motorized system receiving signals from control system 110), valve 290 is opened thus permitting the flow of water into bowl 212. Valve 290 may have a stopper, whereby the spring biases the stopper against movement in one direction to create a normally closed position. In one embodiment, when control system 110 sends a signal to the motor that is connected to valve 290 to open valve 290, a force is applied against the spring causing the spring to be depressed as well as the stopper to be activated and to move upward along with the spring. In another embodiment valve 290 may be opened and closed by a manual actuator and stopper. In this manner, water is allowed to pass through the opening and into bowl 212. In operation, control system 110 may send a signal to another mechanical system for valve 290 to open and to allow water to be released from storage tank 262 to bowl 212 and then flushed from bowl 212.

In other non-limiting embodiments, pump 274 may be connected to a flexible hose acting in place of valve 290 provided for water to pass through. An opening/closing mechanism may be disposed within the hose connected to control system 110, whereby an opening/closing mechanism opens or closes the passage in order to dose a predetermined or registerable amount of water down from the storage tank into the bowl. The passage may be opened or closed by the opening/closing mechanism clinching the flexible hose to prevent water from passing through and releasing the flexible hose to allow the water to pass through.

Storage tank 262 may be connected to a receiving tank 263 by one or more tubes 274 whereby pump 264, a separate pump 267, flushes or otherwise expels the water from bowl 212 through opening 215 by one or more tubes 274 that passes into receiving tank 263. Water may also be flushed by gravity with the opening of valve 290. Flushing may be manually activated by user 160 by a button, lever, or other actuator as well as automatically or through input from a computing device. Receiving tank 263 may also be the internal compartment of storage tank 262 or storage tank 262 may act as both receiving tank 263 and as a storage tank. In one or more embodiments receiving tank 263 may have one or more filters 279 at different elevations in an inner cavity of receiving tank 263 such that eggs that have been captured will not be able to flow back into storage tank 262 and then to bowl 212.

Filters 279 may be interposed between a first point between an inlet to receiving tank 263 and a second point near or at an outlet of receiving tank 263 so that when water is deposited into receiving tank 263, the water must pass through these filters 279 when passing from the inlet of receiving tank 263 to the outlet of receiving tank 263. Receiving tank 263 may be of various shapes and sizes. For example, receiving tank 263 may be cylindrical, spherical, octagonal rectangular, or any other three-dimensional shape. Receiving tank 263 may have a bottom with cylindrical sidewalls in one exemplary embodiment. Similar to storage tank 262, receiving tank 263 may be accessible by door 217 on stand 204 or another door such that user 160 may remove filters 279 to discard the eggs.

In one or more embodiments pump 267 may be a submersible shredder pump encompassing a central motor chamber, in which is mounted an electric motor which is powered by power system 120. In further embodiments any shredding, cutting, or chopping mechanism known by those of ordinary skill in the art may be inserted past valve 290 such that it shreds the eggs after the water is flushed out of bowl 212. Motor is preferably a heavy duty, oil filled, and thermally protected motor, as is well known in the art. Motor may be securely mounted to the housing of the pump. Pump 267 may have an inlet connected to a pumping chamber, and a drive shaft extending through the pumping chamber and into the inlet. The motor rotates the drive shaft whereby the shaft rotates a grinder mechanism, cutting cylinder, or disk in proximity to a plate cutter, thereby affecting the cutting action of pump 267. The motor may be a bidirectional electric motor capable of driving the shaft alternately in a first direction of rotation and a second direction of rotation responsive to control system 110.

Figure 4:
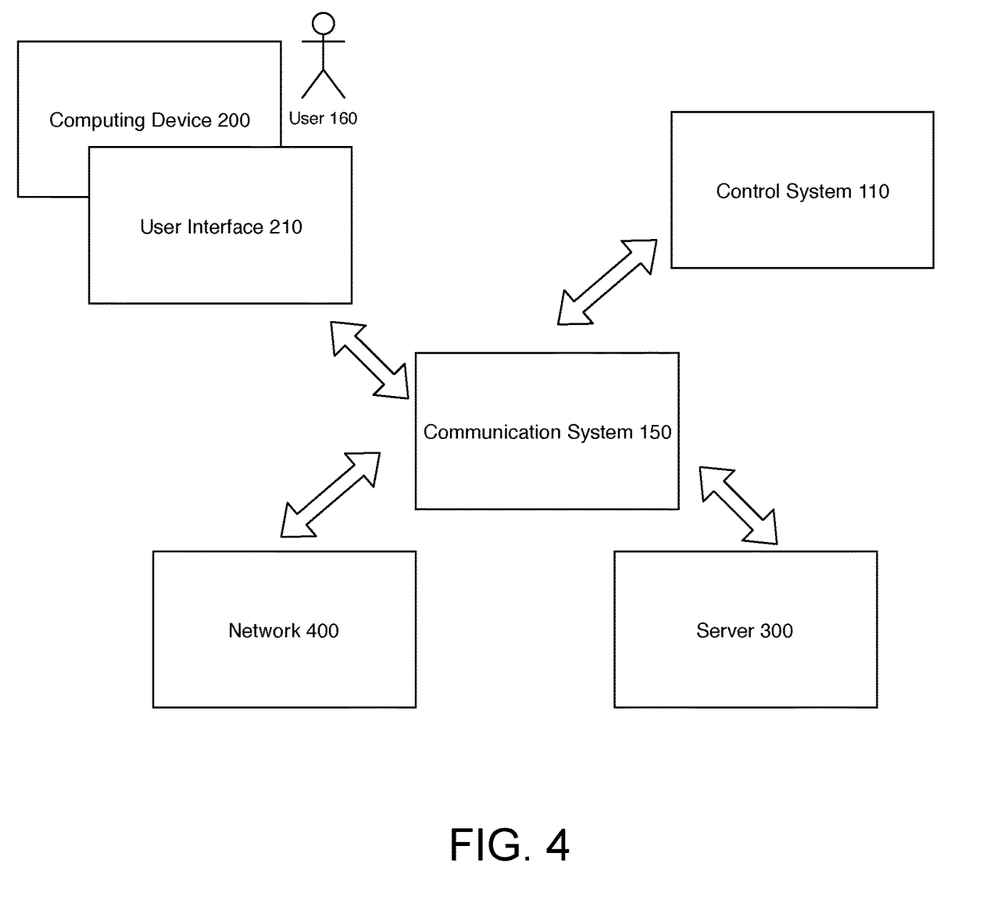
FIG. 4 shows a block diagram of the communication system.

Turning to FIG. 4, FIG. 4 shows an exemplary block diagram of a communication system of mosquito trap 100. Control system 110 may be in communication with communication system 150, as illustrated in FIG. 4, to connect with other or computing devices whereby signals transmitted from the computing devices may be received by control system 110. Communication system 150 may allow user 160 to interact with control system 110 using a computing device such as computing device 200 even if user 160 is not proximate to control system 110. User 160 may access a user interface, such as user interface 210 using computing device 200. User interface 210 may have a plurality of buttons or icons that are selectable by user 160 for communication system 150 to perform particular processes in response to the selections. In one or more non-limiting embodiments, communication system 150 may be innate, built into, or otherwise integrated into existing platforms or systems such as a website, a third party program, Apple™ operating systems (e.g. iOS), Android™, Snapchat™, Instagram™, Facebook™, or any other platform.

Computing device 200 of communication system 150 may be similar to the computing devices of control system 110 and may be any type of computing device that typically operates under the control of one or more operating systems, which control scheduling of tasks and access to system resources. Computing device 200, may in some embodiments, be a computing device such as an iPhone™, Android-based™ phone, or Windows-based™ phone, a tablet, television, desktop computer, laptop computer, gaming system, wearable device electronic glasses, networked router, networked switch, networked, bridge, or any computing device capable of executing instructions with sufficient processor power and memory capacity to perform operations while in communication with network. Computing device 200 may have location tracking capabilities such as Mobile Location Determination System (MLDS) or Global Positioning System (GPS) whereby they may include one or more satellite radios capable of determining the geographical location of computing device 200.

In some embodiments, computing devices 200 may be in communication with one or more servers 300 such as server 300 via communication system 150 or one or more networks such as network 400 connected to communication system 150 as illustrated in FIG. 4 Server 300 may be located at a data center, or any other location suitable for providing service to network 400 whereby server 300 may be in one central location or in many different locations in multiple arrangements. Server 300 may comprise a database server such as MySQL® or Maria DB® server. Server 300 may have an attached data storage system storing software applications and data. Server 300 has a number of modules that provide various functions related to communication system 150. Modules may be in the form of software or computer programs that interact with the operating system of server 300 whereby data collected in databases as instruction-based expressions of components and/or processes under communication system 150 may be processed by one or more processors within server 300 or another component of communication system 150 as well as in conjunction with execution of one or more other computer programs.

Modules may be configured to receive commands or requests from user computing devices 200, server 300, and outside connected devices over network 400. Server 300 may comprise components, subsystems and modules to support one or more management services for communication system 150.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including telecommunications network, a wireless network (including Wi-Fi), and a wireline network. Network 400 may include mobile telephone networks utilizing any protocol or protocols used to communicate among mobile digital computing devices (e.g. computing device 200), such as GSM, GPRS, UMTS, AMPS, TDMA, or CDMA. In one or more non-limiting embodiments, different types of data may be transmitted via network 400 via different protocols. In alternative embodiments, user computing devices 200, may act as standalone devices or whereby they may operate as a peer machine in a peer-to-peer (or distributed) network environment.

Network 400 may further include a system of terminals, gateways, and routers. Network may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices if for instance they are in a remote location not accessible by other networks.

Figure 5:
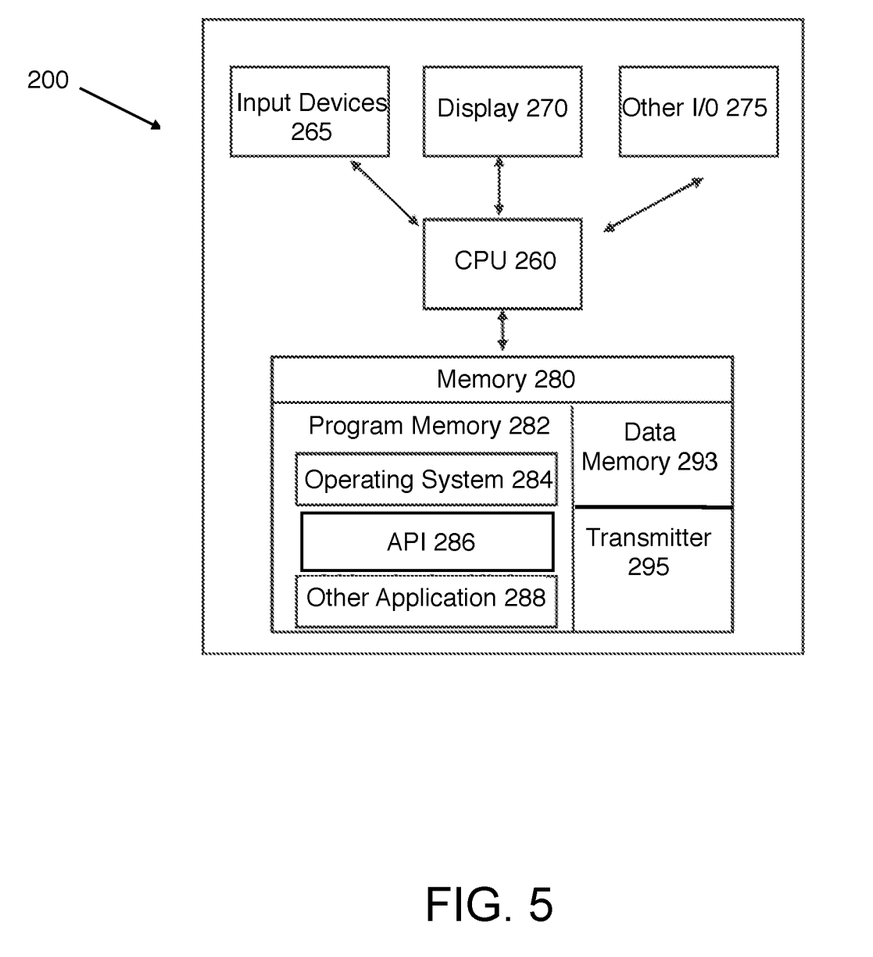
FIG. 5 shows a block diagram of a computing device.

Turning to FIG. 5, FIG. 5 is a block diagram showing various components of computing device 200. Computing device 200 may comprise a housing for containing one or more hardware components that allow access to edit and query communication system 150. User Computing device 200 may include one or more input devices such as input devices 265 that provide input to a CPU (processor) such as CPU 260 of actions related to user 160. Input devices 265 may be implemented as a keyboard, a touchscreen, a mouse, via voice activation, wearable input device, a camera, a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programming interface (API), such as API 286, and other computerized programs or application programs such as application programs 288. Memory 280 may also include data memory such as data memory 293 that may include database query results, configuration data, settings, user options, user preferences, or other types of data, which may be provided to program memory 282 or any element of user computing device 200.

Computing device 200 may have a transmitter 295, such as transmitter 295, to transmit data. Transmitter 295 may have a wired or wireless connection and may comprise a multi-band cellular transmitter to connect to the server 300 over 2G/3G/4G cellular networks. Other embodiments may also utilize Near Field Communication (NFC), Bluetooth, or another method to communicate information.

Users 160 may initially register to become a registered user 160 associated with communication system 150. Communication system 150 may be downloadable and installable on computing device 200. In one or more non-limiting embodiments, communication system 150 may be preinstalled on computing devices 200 by the manufacturer or designer. Further, communication system 150 may be implemented using a web browser via a browser extension or plugin. Server 300 may associate computing devices 200 with an account during the registration process. The account may be user 160 specific or specific to a home, enclosure, or other physical boundary that includes multiple users 160, and a unique identification of each computing device 200 may be stored in the account.

Upon successful authentication of user 160, a homepage or dashboard may be generated. Homepage may be modified, deleted, written to, or otherwise administered by the respective user 160. Display 270 may be presented to user 160 through user interface 210 that may comprise a number of different subpages viewable or accessible through user interface 210 by selecting one or more tabs, User interface 210 on computing device 200 may display statuses for mosquito traps 100 that are registered or otherwise communication with control system 110. For example purposes only, user interface 210 may display information to user 160 logged into an account that includes three mosquito trap 100 that may be located in a patio, front yard, and a backyard. A status for each mosquito trap 100 may be displayed on a list or another format on a user's computing device 200 (e.g. including a smartphone). When a mosquito trap 100 associated with user's 160 account is not connected to the control system 110, a status is not displayed for mosquito trap 100 may be indicated as not connected.

Different states of mosquito trap 100 may be displayed by different indicators through user interface 210, whereby control system 110 receives data from sensor system 140, analyzes the data, and presents the data in the form of status indicators to user 160 through user interface 210 of communication system 150. For example, user interface 210 may display a green circle to indicate that mosquito trap 100 is currently active, functioning properly, and has sufficient water contained in storage tank 262. User interface 210 may display a grey circle indicating that mosquito trap 100 is currently inactive but functioning properly. User interface 210 may display a yellow circle indicating that mosquito trap 100 does not have sufficient water. User interface 210 may display a red circle indicating that mosquito trap 100 is not functioning properly. These colors are for illustrative purposes only, as one of ordinary skill would understand alternative colors or shapes or forms of indicating these statuses (including via text and words) may be utilized instead.

User interface 210 may have an adjustable timer component for each mosquito trap 100 to operate, whereby the timer component may enable input from user 160 for control system 110 to delay state changes when recirculating water. In one embodiment, user interface 210 may allow user 160 to recirculate water only at certain times of the day. For instance, user interface 210 may present to user 160 options to switch the state of control system 110 to operate at preprogrammed times, at times determined according to a random pattern, or any other variation. User interface 210 may further include a calendar or be synchronized with an outside calendar to display user's 160 activities for a set period of time, whereby control system 110 may be customized through user interface 210 to be active or inactive during these user activities.

In other embodiments, control system 110 may have an energy saver mode, whereby user interface 210 may allow user 160 to switch control system 110 to an off or on hibernation state. Further, control system 110 may automatically turn off or enter a hibernation state at a particular time of day or after an elapsed amount of time based on predefined parameters.

User interface 210 may display messages for events generated by mosquito trap 100. All of the messages for events that occur with mosquito trap 100 may be grouped into a single thread to organize the messages. In a similar manner, user interface 210 may display the history of events for mosquito trap 100.

Sensor system 140, as shown in FIG. 1, may include a plurality of detectors mounted or otherwise connected to flushing system 130 and control system 110 whereby sensors may be connected to bowl 212, storage tank 262, or any other component of mosquito trap 100. Sensor system 140 may include one or more suitable types of sensors, such as an optical sensor, an image capturing device such as a still camera or video camera, an audible sensor, a proximity sensor, a movement sensor, or a weight sensor. Sensor system 340 may have infrared ("IR") detectors having photodiode and related amplification and detection circuitry. In one or more other non-limiting embodiments, radio frequencies, magnetic fields, and ultrasonic sensors and transducers may be employed. Sensor system 140 may have one or more digital scales capable of determining the weight and liquid level in storage tank 262 and bowl 212.

Sensor system 140 may have a temperature sensor in order to measure, either directly or indirectly, a temperature associated with or in the general proximity of mosquito trap 100 in any suitable manner. For example, the temperature sensor can include one or more (or any suitable combination) of the following components or devices: a resistive element, a strain gauge, a temperature probe, a thermistor, a resistance temperature detector (RTD), a thermocouple, a thermometer (liquid-in-glass, filled-system, bimetallic, infrared, spot radiation), a semiconductor, an optical pyrometer (radiation thermometer), a fiber optic device, a phase change device, a thermowell, or a thermal imager. Control system 110 may measure the temperature and the microprocessors then compare the received input value from sensor system 140 using a comparison function and evaluate the input data against a setting or expectation of a certain reference value stored within the memory of control system 110. Control system 110 analyzes received input value from sensor system 140 using a comparison function and evaluates the input data against user's 160 setting to determine the amount of water that should be filled in bowl 212 or ejected based on the temperature, such as if the water is too cool or hot.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A mosquito trap, comprising:
a storage tank;
a container for holding water in a stagnant form for a female mosquito to deposit eggs, the container receiving the water from the storage tank through an opening in the container;
a roofing structure having a series of channels in the roofing structure to collect rainwater;
one or more sensors wherein at least one of the one or more sensors determine a weight and liquid level of the water in the container;
a control system that receives data from the one or more sensors and opens or closes a valve positioned at a bottom of the container in response to the weight and the liquid level of the water in the container; and
a remote computing device connected to the control system over a network wherein a user interface is presented to a user on the remote computing device to control one or more operations of the mosquito trap, wherein the control system is configured to delay recirculating the water in the container based on received input from an adjustable timer component on the user interface.

2. The mosquito trap of claim 1, further comprising a submersible shredder pump having a motor that rotates a drive shaft wherein the drive shaft rotates a grinder mechanism that cuts the eggs of the female mosquito after leaving the container.

3. The mosquito trap of claim 1, further comprising a receiving compartment that receives the water from the container, the receiving compartment having filters at different elevations to capture the eggs after leaving the container.

4. The mosquito trap of claim 1, wherein the storage tank is enclosed in a stand of the mosquito trap positioned below the container, the stand extending downward into a base, the base used as support.

5. The mosquito trap of claim 1, wherein another one of the one or more sensors detects a temperature of the water in the container wherein in response to the detected temperature, the control system sends a signal to adjust an amount of the water in the container.

6. The mosquito trap of claim 1, wherein the channels direct rainwater from the roofing structure down through one or more connectors and into the storage tank, wherein the one or more connectors hold the roofing structure in place above the container.

7. A mosquito trap, comprising:
a storage tank;
a base, a stand extending upward from the base;
a container holding water in stagnant form for a female mosquito to deposit their eggs, the container in fluid connection to the storage tank and connected by one or more tubes such that the water is received from the storage tank;
a roofing structure positioned above the container to provide shade for the water, the roofing structure having a series of channels in the roofing structure to direct rainwater from the roofing structure down through one or more connectors and into the storage tank, wherein the one or more connectors hold the roofing structure in place above the container; and
a netting extending below the roofing structure and above the container wherein the netting is positioned between the channels, the netting sized to prevent larger animals from accessing the container while allowing mosquitos to have access to the water.

8. The mosquito trap of claim 7, wherein the stand has a door to provide access to the storage tank and one or more filters, the one or more filters for capturing the eggs after leaving the container.

9. The mosquito trap of claim 7, further comprising one or more valves to control a flow of the water to and from the container by an opening.

10. The mosquito trap of claim 7, further comprising a submersible shredder pump having a motor that rotates a drive shaft wherein the drive shaft rotates a grinder mechanism that cuts the eggs of the female mosquito after leaving the container.

11. The mosquito trap of claim 10, further comprising a receiving compartment that receives the water from the container, the receiving compartment in fluid communication with the storage tank.

* * * * *